(12) United States Patent
Zhang

(10) Patent No.: US 10,321,102 B2
(45) Date of Patent: Jun. 11, 2019

(54) HELMET WITH SPORTS CAMERA

(71) Applicant: Ming Zhang, FoShan (CN)

(72) Inventor: Ming Zhang, FoShan (CN)

( * ) Notice: Subject to any disclaimer, the term of this patent is extended or adjusted under 35 U.S.C. 154(b) by 0 days.

(21) Appl. No.: 15/220,537

(22) Filed: Jul. 27, 2016

(65) Prior Publication Data

US 2017/0347735 A1 Dec. 7, 2017

(51) Int. Cl.
| | |
|---|---|
| *H04N 7/18* | (2006.01) |
| *H04N 5/232* | (2006.01) |
| *H04N 5/77* | (2006.01) |
| *H04N 1/00* | (2006.01) |
| *A42B 3/04* | (2006.01) |

(52) U.S. Cl.
CPC .............. *H04N 7/185* (2013.01); *A42B 3/042* (2013.01); *H04N 1/00103* (2013.01); *H04N 5/23203* (2013.01); *H04N 5/23241* (2013.01); *H04N 5/23245* (2013.01); *H04N 5/23293* (2013.01); *H04N 5/77* (2013.01); *H04N 2201/0055* (2013.01); *H04N 2201/0084* (2013.01)

(58) Field of Classification Search
CPC .............. A42B 3/0426; H04N 1/00103; H04N 5/23203; H04N 5/23241; H04N 5/23245; H04N 5/23293; H04N 5/77; H04N 7/185; H04N 2201/0055; H04N 2201/0084
USPC ........................................................ 348/148
See application file for complete search history.

(56) References Cited

U.S. PATENT DOCUMENTS

| | | | |
|---|---|---|---|
| 9,247,779 B1* | 2/2016 | Aloumanis ............ G08G 1/137 |
| 2003/0122958 A1* | 7/2003 | Olita ........................ A42B 3/042 348/373 |
| 2013/0128046 A1* | 5/2013 | Gindin .................. G07C 5/0891 348/148 |
| 2013/0215281 A1* | 8/2013 | Hobby ..................... G06F 3/005 348/207.1 |
| 2014/0268376 A1* | 9/2014 | O'Neill ................. G03B 17/565 359/827 |
| 2014/0273863 A1* | 9/2014 | Luizzi ..................... H04M 1/05 455/66.1 |
| 2015/0036047 A1* | 2/2015 | Bledsoe ............... H04N 5/2254 348/375 |

(Continued)

*Primary Examiner* — William C Vaughn, Jr.
*Assistant Examiner* — Jae N Noh
(74) *Attorney, Agent, or Firm* — Kwan & Olynick LLP

(57) ABSTRACT

A helmet with a sports camera comprises a body and a picture recording module which is detachably mounted on the body. The picture recording module includes an outer shell and a camera disposed in the outer shell. The camera is electrically connected to a control system; the control system is connected to a power module; the control system is further electrically connected to an LED indicator and an operating button; in use, through controlling the operating button, a user can take photos or record a video. Advantages of the helmet with a sports camera are summarized as follows. 1. The helmet and the camera are integrated, which facilitates the photographing of sceneries. 2. LED indicators and operation buttons on the helmet can control the start-up, shooting, or recording of the camera, and the micoUSB data interface can be used for charging, data copying, or connected to a PC camera. 3. An external vehicle-mounted display can be provided, which operates to real-time show the shot pictures or sceneries for users to browse through wireless communication technology.

1 Claim, 4 Drawing Sheets

(56) References Cited

U.S. PATENT DOCUMENTS

2016/0044276 A1\* 2/2016 Shearman ............ A42B 3/0426
                                                      348/207.1
2016/0344918 A1\* 11/2016 Tao .................... H04N 5/23206
2017/0176746 A1\* 6/2017 Weller ............... G02B 27/0172

\* cited by examiner

HELMET WITH SPORTS CAMERA

FIELD OF THE INVENTION

The invention relates to equipment for cycling, and more particularly to a helmet with a sports camera.

BACKGROUND

With the improvement of living standards, people pay more and more attention to outdoor sports, among which cycling is fashionable and almost the most popular. Cycling builds up human' body and presents people with plenty of sceneries. During the cycling, people like to photograph beautiful landscape. However, cameras and cell phones often increase the loads for a cycler, and during cycling, stopping to photograph wastes lot of time and thus delays the preset arrival time. So, it is urgent to upgrade conventional sports helmets.

SUMMARY

In view of the above-described problems, it is one objective of the invention to provide a helmet with a sports camera that has simple structure, convenient operation, and low production costs.

To achieve the above objective, in accordance with one embodiment of the invention, there is provided a helmet with a sports camera. The helmet with a sports camera comprises a body and a picture recording module which is detachably mounted on the body. The picture recording module comprises an outer shell and a camera disposed in the outer shell; the camera is electrically connected to a control system; the control system is connected to a power module; the control system is further electrically connected to an LED indicator and an operating button; in use, through controlling the operating button, a user can take photos or record a video.

As an improvement of the invention, the control system is also electrically connected to a wireless communication module.

Preferably, the control system is also electrically connected to a data interface; through the data interface, data is read and the control system is charged.

Preferably, the outer shell comprises a quick release device, and the quick release device matches a mounting seat on the body.

Preferably, the wireless communication module communicates with a mobile terminal disposed on a handlebar through wireless communication mode, and the video recorded by the helmet is real-time transmitted to a display screen of the mobile terminal.

Preferably, the mobile terminal comprises a power module, a wireless communication module, a display, and an operating button, all of which are electrically connected to a control system of the mobile terminal; through controlling the operating button, a user can take photos or record a video in a wireless mode.

Preferably, a rear-mounted camera is disposed at a rear part of the body 1 of the helmet and is electrically connected to the control system.

Advantages of the helmet with a sports camera of the invention are summarized as follows. 1. The helmet with a sports camera that has simple structure, convenient operation, and low production costs, thus having strong market competitiveness. 2. The helmet and the camera are integrated, which facilitates the photographing of sceneries. 3. LED indicators and operation buttons on the helmet can control the start-up, shooting, or recording of the camera, and the micoUSB data interface can be used for charging, data copying, or connected to a PC camera. 4. An external vehicle-mounted display can be provided, which can real-time show the shot pictures or sceneries for users to browse through wireless communication technology.

DETAILED DESCRIPTION OF THE EMBODIMENTS

Figure 1:
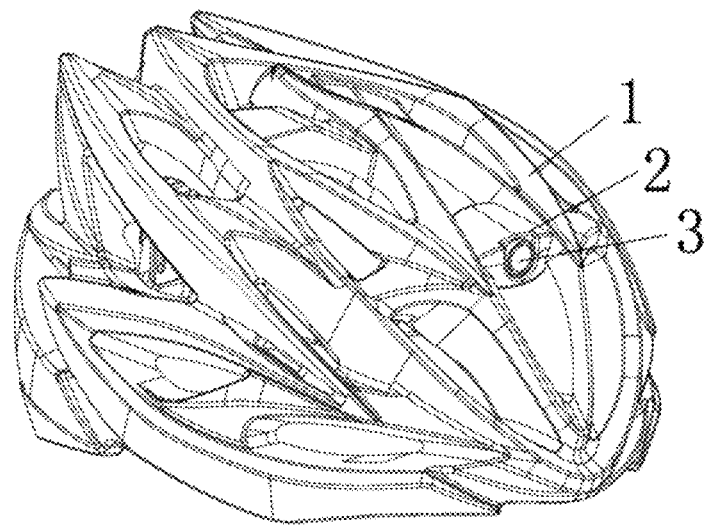
FIG. 1 is a schematic diagram of a helmet with a sports camera of the invention.
Figure 2:
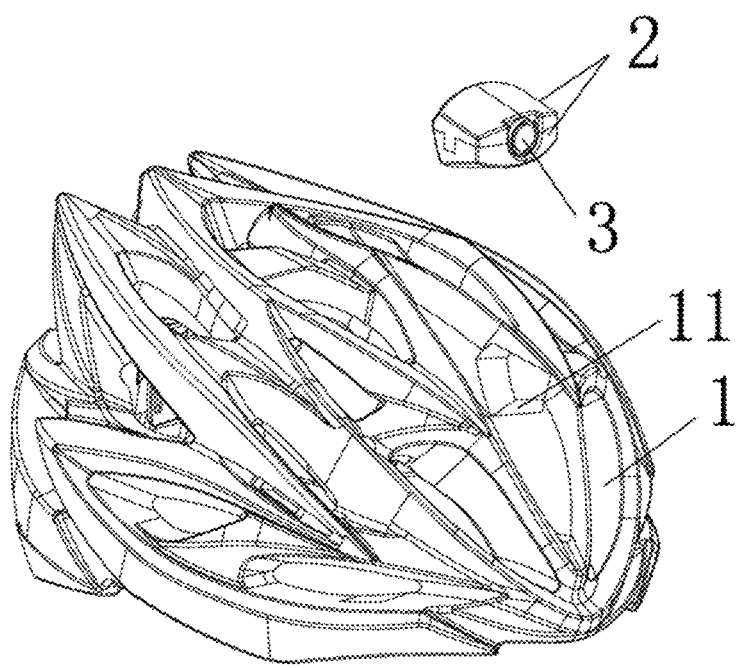
FIG. 2 is an assembly drawing of a helmet with a sports camera of the invention.
Figure 3:
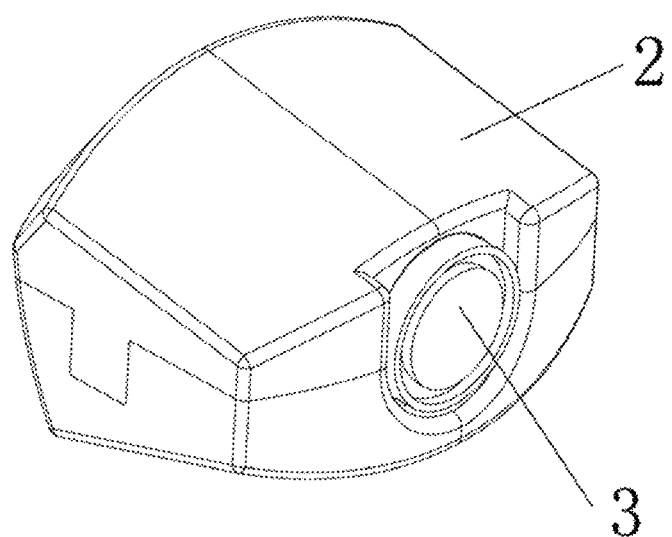
FIG. 3 is a schematic diagram of a picture recording module of a helmet with a sports camera of the invention.
Figure 4:
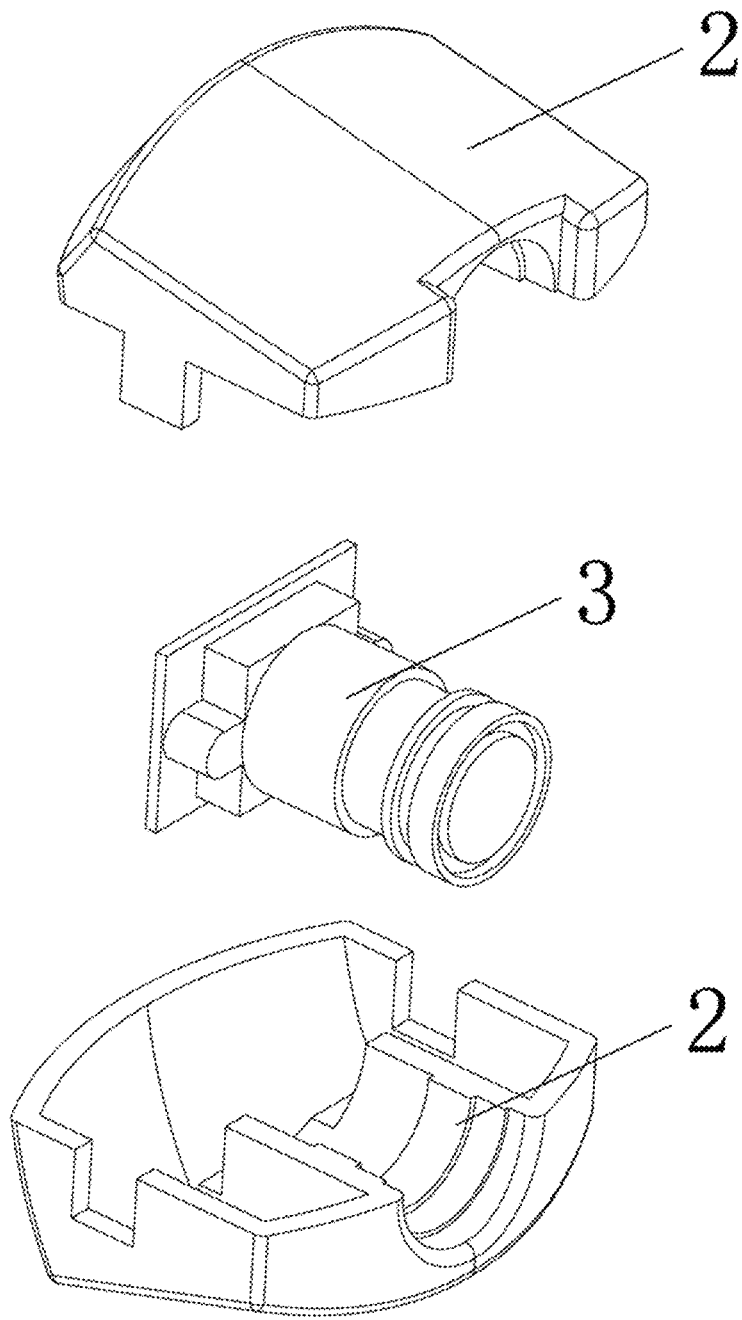
FIG. 4 is an exploded view of a picture recording module of a helmet with a sports camera of the invention.
Figure 5:
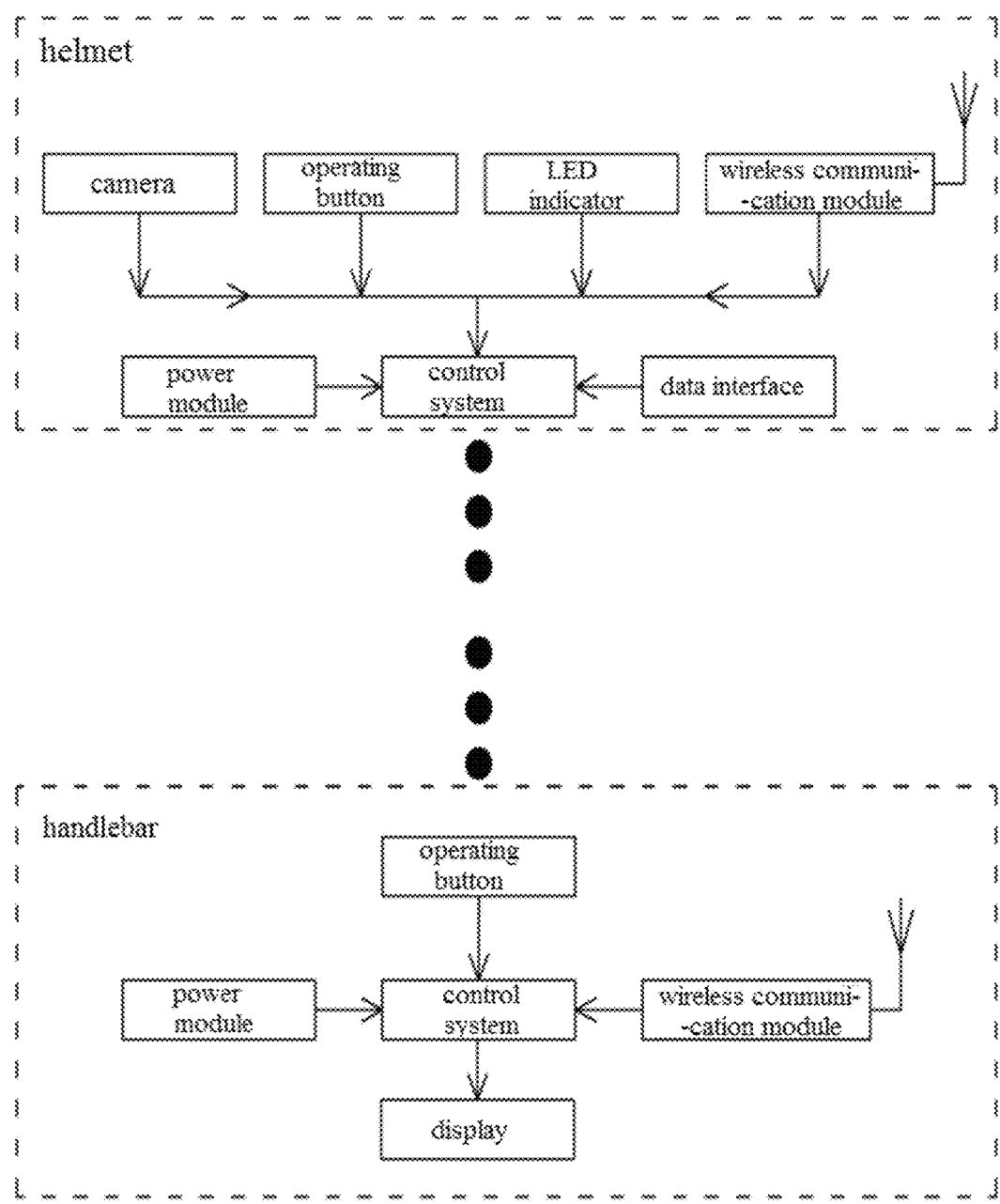
FIG. 5 is a principle diagram of electric components of a helmet with a sports camera of the invention.

The invention is described herein below with reference to the accompanying drawings. The invention provides a helmet with a sports camera, the helmet comprising a body 1 and a picture recording module which is detachably mounted on the body 1. The picture recording module comprises an outer shell 2 and a camera 3 disposed in the outer shell. The camera 3 is electrically connected to a control system. The control system is connected to a power module. The control system is further electrically connected to an LED indicator and an operating button. Through controlling the operating button, a user can take photos or record a video.

The control system is also electrically connected to a wireless communication module.

The control system is also electrically connected to a data interface. Through the data interface, a user can read data and charge the control system.

The outer shell 2 comprises a quick release device, which matches a mounting seat 11 on the body 1.

The wireless communication module communicates with a mobile terminal disposed on a handlebar through wireless communication mode, and the video recorded by the helmet is real-time transmitted to a display screen of the mobile terminal.

The mobile terminal comprises a power module, a wireless communication module, a display, and an operating button, all of which are electrically connected to a control system. Through controlling the operating button, a user can take photos or record a video.

A rear-mounted camera is disposed at the rear part of the body 1 of the helmet and is electrically connected to the control system.

Working principle of the helmet with a sports camera is detailed as follows. During riding or cycling, a user wears the helmet on his or her head. The user can take photos or record a video by manually operating the camera, and the recorded contents are automatically saved in the memory card. Preferably, to facilitates the user to know the working state of the picture recording module in real time, LED indicators are disposed on the shell of the picture recording module. The working state of the picture recording module can be shown through controlling different LED indicators to work or through displaying different working colors.

Preferably, to facilitate the carrying of the helmet and guard against theft, the picture recording module is mounted on the body of the helmet in a snap-in mode. In use, the picture recording module is mounted on the helmet. When the helmet needs charging or is in nonuse, the picture recording module is detached. The user can read the data or charge the device through the micoUSB data interface of the module.

Preferably, to help the user know the shot or recorded contents of the picture recording module in real time, a mobile terminal is provided and disposed on the handlebar. The mobile terminal is electrically connected to the picture recording module via a wireless communication module, such as WiFi, Bluetooth, 3G, 4G, and the like. In use, the two devices are connected through data butting, and pictures or sceneries caught by the camera are real-time transmitted to the mobile terminal on the handlebar and then displayed by a display screen. Glancing over the sceneries, the user can operate the button of the mobile terminal for remote photographing or recording video.

Compared with conventional technologies, the helmet is modularized, which is favorable for users to assemble the helmet as needed. In addition, the helmet and the picture recording module can be carried independently. The external mobile terminal can real-time show the shot or recorded pictures or sceneries, which is convenient for users to shoot, so the helmet has bright future and can be widely used.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention, the changes and modifications include the assembly structure of the picture recording module and the communication mode of the mobile terminal.

The invention claimed is:

1. A bicycle helmet with a sports camera, comprising a body and a picture recording module which is detachably mounted on the body;

wherein the picture recording module comprises an outer shell and a camera with a lens encapsulated within the outer shell, the outer shell being detachably coupled to a mounting seat located on the body of the bicycle helmet via a snap-in mode, the outer shell comprising a top half and a bottom half that, when mated together, form an aperture for the lens of the camera when the camera is encapsulated in the outer shell, wherein when the camera is encapsulated in the outer shell, the two halves of the outer shell surround and encapsulate the camera exposing only the lens of the camera through the aperture;

the camera is electrically connected to a control system; the control system is connected to a power module; the control system is further electrically connected to a plurality of LED indicators and an operating button, the plurality of LED indicators being disposed on the outer shell of the picture recording module, wherein a working state of the picture recording module is shown through controlling different LED indicators in the plurality of LED indicators to work or through displaying different working colors; in use, through controlling the operating button, a user can take photos or record a video;

wherein the control system is also electrically connected to a wireless communication module;

wherein the control system is also electrically connected to a data interface; through the data interface, data is read and the control system is charged;

wherein the outer shell comprises a quick release device, and the quick release device matches a mounting seat on the body;

wherein the wireless communication module communicates with a mobile terminal disposed on a handlebar of a bicycle through wireless communication mode, and if the video is being captured by the camera, the captured video is real-time transmitted to a display screen of the mobile terminal for real-time display;

wherein the mobile terminal comprises a power module, a wireless communication module, a display, and an operating button, all of which are electrically connected to a control system of the mobile terminal; through controlling the operating button, a user can take photos or record a video in a wireless mode;

wherein a rear-mounted camera is disposed at a rear part of the body of the helmet and is electrically connected to the control system.

* * * * *